United States Patent
Verma et al.

(10) Patent No.: US 11,109,278 B2
(45) Date of Patent: Aug. 31, 2021

(54) MULTIPLEXING CLIENTS OF DIFFERENT GENERATIONS IN TRIGGER-BASED TRANSMISSIONS

(71) Applicant: QUALCOMM Incorporated, San Diego, CA (US)

(72) Inventors: Lochan Verma, San Diego, CA (US); Bin Tian, San Diego, CA (US); Sameer Vermani, San Diego, CA (US); Lin Yang, San Diego, CA (US); Jialing Li Chen, San Diego, CA (US); George Cherian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 153 days.

(21) Appl. No.: 16/162,804

(22) Filed: Oct. 17, 2018

(65) Prior Publication Data

US 2019/0124556 A1    Apr. 25, 2019

Related U.S. Application Data

(60) Provisional application No. 62/575,173, filed on Oct. 20, 2017.

(51) Int. Cl.
*H04W 28/26* (2009.01)
*H04W 72/04* (2009.01)
(Continued)

(52) U.S. Cl.
CPC ........... *H04W 28/26* (2013.01); *H04L 5/0039* (2013.01); *H04L 5/0044* (2013.01);
(Continued)

(58) Field of Classification Search
CPC combination set(s) only.
See application file for complete search history.

(56) References Cited

U.S. PATENT DOCUMENTS 10,700,906 B2 * 6/2020 Montreuil ............. H04L 5/0094
2016/0165574 A1 * 6/2016 Chu ................... H04W 72/0413
370/312
(Continued)

FOREIGN PATENT DOCUMENTS

WO    WO-2017011274 A1    1/2017

OTHER PUBLICATIONS

International Search Report and Written Opinion—PCT/US2018/056506—ISA/EPO—dated Apr. 4, 2019.
(Continued)

*Primary Examiner* — Yee F Lam
(74) *Attorney, Agent, or Firm* — Kevin M. Donnelly (57) ABSTRACT

This disclosure provides systems, methods, and apparatus, including computer programs encoded on computer storage media, for multiplexing clients of different generations in trigger-based transmissions, including trigger-based transmissions in extremely-high throughput (EHT) Wi-Fi systems. An access point (AP) may generate a trigger frame compatible with two types of stations (STAs), such as EHT STAs and legacy (or high efficiency (HE)) STAs. The AP may transmit the trigger frame to a group of STAs, where legacy STAs may process the trigger frame a legacy trigger frame. EHT STAs may process the trigger frame to determine resource unit (RU) allocations for uplink transmissions in a bandwidth greater than a legacy bandwidth. An EHT STA may determine the resources in the larger bandwidth based on an EHT RU allocation table, a legacy RU allocation table and an additional bit in the trigger frame, or an ordering of RU allocations in the trigger frame.

6 Claims, 9 Drawing Sheets

(51) Int. Cl.
  *H04W 74/08* (2009.01)
  *H04W 84/12* (2009.01)
  *H04L 5/00* (2006.01)
  *H04L 27/26* (2006.01)
  *H04W 88/10* (2009.01)

(52) U.S. Cl.
  CPC .......... *H04L 5/0064* (2013.01); *H04L 5/0091* (2013.01); *H04L 27/2602* (2013.01); *H04W 72/042* (2013.01); *H04W 72/0446* (2013.01); *H04W 88/10* (2013.01); *H04L 5/0028* (2013.01); *H04W 72/048* (2013.01); *H04W 74/0808* (2013.01); *H04W 84/12* (2013.01)

(56) References Cited

U.S. PATENT DOCUMENTS

| | | | |
|---|---|---|---|
| 2016/0316455 A1 | 10/2016 | Asterjadhi et al. | |
| 2017/0048034 A1* | 2/2017 | Bharadwaj | H04W 72/082 |
| 2017/0064689 A1 | 3/2017 | Nimbalker et al. | |
| 2017/0094664 A1* | 3/2017 | Lee | H04L 5/0091 |
| 2017/0126453 A1* | 5/2017 | Montreuil | H04L 5/0094 |
| 2017/0149523 A1* | 5/2017 | Li | H04L 5/0037 |
| 2017/0156148 A1* | 6/2017 | Park | H04L 5/0048 |
| 2017/0181136 A1* | 6/2017 | Bharadwaj | H04W 84/12 |
| 2017/0265135 A1 | 9/2017 | Cariou et al. | |
| 2017/0294992 A1* | 10/2017 | Chu | H04W 72/0446 |
| 2018/0323837 A1* | 11/2018 | Park | H04W 72/0453 |
| 2019/0090259 A1* | 3/2019 | Oteri | H04W 28/0242 |
| 2019/0190752 A1* | 6/2019 | Chen | H04L 27/0008 |
| 2019/0349232 A1* | 11/2019 | Cariou | H04L 5/0053 |
| 2019/0356410 A1* | 11/2019 | Alpert | H04L 1/0003 |
| 2020/0162963 A1* | 5/2020 | Alpert | H04W 28/06 |

OTHER PUBLICATIONS

Partial International Search Report—PCT/US2018/056506—ISA/EPO—dated Jan. 31, 2019.

* cited by examiner

MULTIPLEXING CLIENTS OF DIFFERENT GENERATIONS IN TRIGGER-BASED TRANSMISSIONS

CROSS REFERENCES

This Patent Application claims priority to U.S. Provisional Patent Application No. 62/575,173 by VERMA, et al., filed Oct. 20, 2017, entitled "ULTRA-HIGH THROUGHPUT (EHT) TRIGGER-BASED TRANSMISSIONS," and assigned to the assignee hereof. The disclosure of the prior Application is considered part of and is incorporated by reference in this Patent Application.

TECHNICAL FIELD

This description relates to wireless communication, and more specifically to multiplexing clients of different generations in trigger-based transmissions.

DESCRIPTION OF THE RELATED TECHNOLOGY

Wireless communications systems are widely deployed to provide various types of communication content such as voice, video, packet data, messaging, broadcast, and so on. These systems may be multiple-access systems capable of supporting communication with multiple users by sharing the available system resources (such as, time, frequency, and power). A wireless network, for example a wireless local area network (WLAN), such as a Wi-Fi (Institute of Electrical and Electronics Engineers (IEEE) 802.11) network may include an access point (AP) that may communicate with one or more stations (STAs) or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a STA may communicate with an associated AP via downlink and uplink. The downlink (or forward link) may refer to the communication link from the AP to the station, and the uplink (or reverse link) may refer to the communication link from the station to the AP.

SUMMARY

The systems, methods and devices of this disclosure each have several innovative aspects, no single one of which is solely responsible for the desirable attributes disclosed herein.

One innovative aspect of the subject matter described in this disclosure can be implemented in a method of wireless communication. The method can include generating a trigger frame indicating an index of one or more resource unit (RU) allocation tables, where the trigger frame can be a legacy trigger frame compatible with a first type of stations (STAs) and a second type of STAs. The method can further include transmitting the trigger frame to a set of STAs including at least a first STA of the first type of STAs and at least a second STA of the second type of STAs, where the first type of STAs and the second type of STAs determine resources for transmission differently using the index of the one or more RU allocation tables, and receiving a transmission from a STA of the set of STAs in response to the trigger frame, where the transmission can be received in a first bandwidth if the STA is the first type of STA and can be received in a second bandwidth greater than the first bandwidth if the STA is the second type of STA.

Another innovative aspect of the subject matter described in this disclosure can be implemented in an apparatus for wireless communication. The apparatus can include means for generating a trigger frame indicating an index of one or more RU allocation tables, where the trigger frame can be a legacy trigger frame compatible with a first type of STAs and a second type of STAs. The apparatus can further include means for transmitting the trigger frame to a set of STAs, where the first type of STAs and the second type of STAs determine resources for transmission differently using the index of the one or more RU allocation tables, and means for receiving a transmission from a STA of the set of STAs in response to the trigger frame, where the transmission can be received in a first bandwidth if the STA is the first type of STA and can be received in a second bandwidth greater than the first bandwidth if the STA is the second type of STA.

Another innovative aspect of the subject matter described in this disclosure can be implemented in another apparatus for wireless communication. The apparatus can include a processor, memory in electronic communication with the processor, and instructions stored in the memory. The instructions can be operable to cause the processor to generate a trigger frame indicating an index of one or more RU allocation tables, where the trigger frame can be a legacy trigger frame compatible with a first type of STAs and a second type of STAs. The instructions can be further operable to cause the processor to transmit the trigger frame to a set of STAs including at least a first STA of the first type of STAs and at least a second STA of the second type of STAs, where the first type of STAs and the second type of STAs determine resources for transmission differently using the index of the one or more RU allocation tables, and receive a transmission from a STA of the set of STAs in response to the trigger frame, where the transmission can be received in a first bandwidth if the STA is the first type of STA and can be received in a second bandwidth greater than the first bandwidth if the STA is the second type of STA.

Another innovative aspect of the subject matter described in this disclosure can be implemented in a non-transitory computer-readable medium for wireless communication. The non-transitory computer-readable medium can include instructions operable to cause a processor to generate a trigger frame indicating an index of one or more RU allocation tables, where the trigger frame can be a legacy trigger frame compatible with a first type of STAs and a second type of STAs. The instructions can be further operable to cause the processor to transmit the trigger frame to a set of STAs including at least a first STA of the first type of STAs and at least a second STA of the second type of STAs, where the first type of STAs and the second type of STAs determine resources for transmission differently using the index of the one or more RU allocation tables, and receive a transmission from a STA of the set of STAs in response to the trigger frame, where the transmission can be received in a first bandwidth if the STA is the first type of STA and can be received in a second bandwidth greater than the first bandwidth if the STA is the second type of STA.

In some implementations, the one or more RU allocation tables include a first RU allocation table corresponding to the first type of STAs and a second RU allocation table corresponding to the second type of STAs, and the trigger frame allocates a first set of RUs in the first bandwidth for the first type of STAs based on the first RU allocation table and the index; and the trigger frame allocates a second set of RUs in the second bandwidth for the second type of STAs based on the second RU allocation table and the index.

In some implementations, the one or more RU allocation tables include a legacy RU allocation table, and the trigger frame indicates an additional bit, where the first type of STAs determine the resources for transmission using the indicated index and the legacy RU allocation table, and the second type of STAs determine the resources for transmission using the indicated index, the legacy RU allocation table, and the indicated additional bit.

Some implementations include allocating, for a set of STAs of the set of STAs, sets of resources for transmission in order of increasing frequency, where the second STA of the second type of STAs determines the resources for transmission based on a set of resources allocated for a third STA.

Some implementations may include generating the trigger frame further may include operations, features, means, or instructions for indicating the second bandwidth using a bit reserved field in a common information field.

Some implementations may include, generating the trigger frame further may include operations, features, means, or instructions for indicating the second bandwidth using a bit in a high efficiency signaling A (HE-SIG-A) reserved field.

Another innovative aspect of the subject matter described in this disclosure can be implemented in a method of wireless communication. The method can include receiving a trigger frame indicating an index of one or more RU allocation tables, where the trigger frame can be a legacy trigger frame compatible with a first type of STAs and a second type of STAs, and identifying a bandwidth associated with the trigger frame based at least in part on a bit indicated in the trigger frame, the bandwidth greater than a legacy bandwidth associated with the first type of STAs. The method can further include determining resources for transmission using the index of the one or more RU allocation tables, and transmitting a transmission in the determined resources of the identified bandwidth in response to the trigger frame.

Another innovative aspect of the subject matter described in this disclosure can be implemented in an apparatus for wireless communication. The apparatus can include means for receiving a trigger frame indicating an index of one or more RU allocation tables, where the trigger frame can be a legacy trigger frame compatible with a first type of STAs and a second type of STAs, and means for identifying a bandwidth associated with the trigger frame based at least in part on a bit indicated in the trigger frame, the bandwidth greater than a legacy bandwidth associated with the first type of STAs. The apparatus can include further means for determining resources for transmission using the index of the one or more RU allocation tables, and means for transmitting a transmission in the determined resources of the identified bandwidth in response to the trigger frame.

Another innovative aspect of the subject matter described in this disclosure can be implemented in another apparatus for wireless communication. The apparatus can include a processor, memory in electronic communication with the processor, and instructions stored in the memory. The instructions can be operable to cause the processor to receive a trigger frame indicating an index of one or more RU allocation tables, where the trigger frame can be a legacy trigger frame compatible with a first type of STAs and a second type of STAs, and identify a bandwidth associated with the trigger frame based at least in part on a bit indicated in the trigger frame, the bandwidth greater than a legacy bandwidth associated with the first type of STAs. The instructions can be further operable to cause the processor to determine resources for transmission using the index of the one or more RU allocation tables, and transmit a transmission in the determined resources of the identified bandwidth in response to the trigger frame.

Another innovative aspect of the subject matter described in this disclosure can be implemented in a non-transitory computer-readable medium for wireless communication. The non-transitory computer-readable medium can include instructions operable to cause a processor to receive a trigger frame indicating an index of one or more RU allocation tables, where the trigger frame can be a legacy trigger frame compatible with a first type of STAs and a second type of STAs, and identify a bandwidth associated with the trigger frame based at least in part on a bit indicated in the trigger frame, the bandwidth greater than a legacy bandwidth associated with the first type of STAs. The instructions can be further operable to cause the processor to determine resources for transmission using the index of the one or more RU allocation tables, and transmit a transmission in the determined resources of the identified bandwidth in response to the trigger frame.

In some implementations the one or more RU allocation tables include a first RU allocation table corresponding to the first type of STAs and a second RU allocation table corresponding to the second type of STAs, and where determining the resources for transmission further includes, and determining the resources for transmission using the index and the second RU allocation table.

In some implementations may include, the one or more RU allocation tables include a legacy RU allocation table, and determining the resources for transmission further includes, and identifying an additional bit, where the resources for transmission may be determined using the index, the legacy RU allocation table, and the identified additional bit.

Some implementations may include, determining the resources for transmission based on a set of resources allocated for another STA and an allocation frequency order.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving radio frequency (RF) signals according to any of the IEEE 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

Techniques are disclosed for wireless devices to support multiplexing clients of different generations in trigger-based transmissions. For example, an access point (AP) that supports multiple generations of station (STA) may support uplink transmissions in, for example, an extremely-high throughput (EHT) wireless communications system. EHT systems also may be referred to as ultra-high throughput (UHT) systems, Next Generation Wi-Fi systems, or Next Big Thing (NBT) systems, and may support coverage for multiple types of mobile stations (STAs). For example, an AP in a EHT system may provide coverage for EHT STAs, as well as legacy (or high efficiency (HE)) STAs. The AP may multiplex boy EHT STAs and HE STAs in trigger-based uplink transmissions. That is, the AP may operate using techniques to provide backwards compatibility for HE STAs, while providing additional functionality for EHT STAs.

To trigger uplink transmissions from one or more STAs of different generations, the AP may transmit a trigger frame. The trigger frame may be formatted as a legacy trigger frame so that HE STAs may detect and process the trigger frame to determine uplink transmissions. The AP may include resource unit (RU) allocations in the trigger frame. An STA may receive the trigger frame, identify the RU allocation corresponding to that STA, and may transmit an uplink transmission to the AP using the allocated resources. Legacy STAs may support transmitting in a narrower bandwidth (for example, 160 megahertz (MHz)) than EHT STAs (which may transmit in a 320 MHz bandwidth). The AP may include an additional indication in the trigger frame for EHT STAs, so that the EHT STAs may identify the bandwidth to use (for example, the legacy bandwidth or the greater EHT bandwidth).

In some implementations, the AP and EHT STAs may use a new EHT RU allocation table when operating in the larger bandwidth. An EHT STA receiving the trigger frame may use a same RU allocation field as HE STAs to determine the RU allocation index, but may use a different table to look up an entry corresponding to the RU allocation index. In some other implementations, the AP may include an additional bit in the trigger frame to indicate to EHT STAs whether to use a primary or a secondary 160 MHz portion of the 320 MHz bandwidth. The EHT STAs may use a legacy RU allocation table, which also may include an additional entry corresponding to this wider bandwidth. In yet some other implementations, the AP may order the RU allocations in the trigger frame in increasing order. An EHT STA may parse the user information for multiple STAs, and may sum the allocated resources for each STA preceding the resource allocation for that EHT STA. The EHT STA may determine the resources for transmission based on the sum and the ordering of the allocations. In each of these implementations, legacy STAs may utilize legacy operations to determine a bandwidth for transmission based on a bandwidth field in the trigger frame. Additionally, if the trigger frame does not indicate the wider EHT bandwidth, an EHT STA may utilize this legacy bandwidth field to determine the resources for transmission.

Particular implementations of the subject matter described in this disclosure can be implemented to realize one or more of the following potential advantages. Specifically, the proposed techniques allow for an AP to trigger both EHT and legacy STAs using a single trigger frame. The AP may schedule these STAs to operate simultaneously without colliding in frequency by scheduling legacy STAs in a legacy bandwidth, and scheduling EHT STAs in the legacy bandwidth or in an extended bandwidth available for EHT devices. An AP configured to perform the proposed techniques may therefore efficiently schedule uplink transmissions across the frequency spectrum, while implementing backwards compatible trigger frames.

Figure 1:
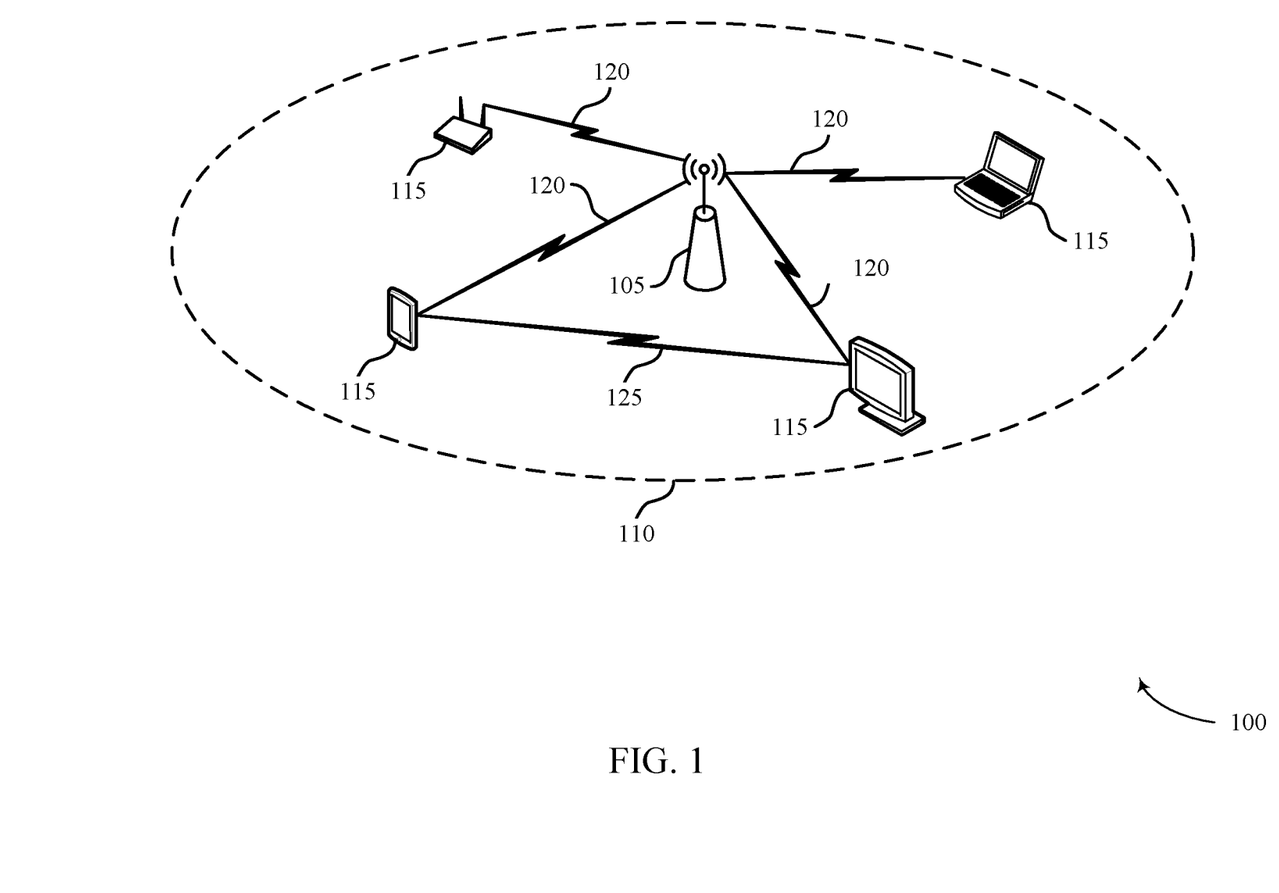
FIGS. 1-3 show examples of wireless communications systems that support multiplexing clients of different generations in trigger-based transmissions.

FIG. 1 shows an example of a wireless communications system that supports multiplexing clients of different generations in trigger-based transmissions. The wireless communications system may be an example of a wireless local area network (WLAN) 100 (also known as a Wi-Fi network) (such as Next Generation, Next Big Thing (NBT), Ultra-High Throughput (UHT) or EHT Wi-Fi network) configured in accordance with various aspects of the present disclosure. As described herein, the terms Next Generation, NBT, EHT, and EHT may be considered synonymous and may each correspond to a Wi-Fi network supporting a high volume of space-time-streams. The WLAN 100 may include an AP 105 and multiple associated STAs 115, which may represent devices such as mobile stations, personal digital assistant (PDAs), other handheld devices, netbooks, notebook computers, tablet computers, laptops, display devices (such as TVs, computer monitors, etc.), printers, etc. The AP 105 and the associated stations 115 may represent a basic service set (BSS) or an extended service set (ESS). The various STAs 115 in the network are able to communicate with one another through the AP 105. Also shown is a coverage area 110 of the AP 105, which may represent a basic service area (BSA) of the WLAN 100. An extended network station (not shown) associated with the WLAN 100 may be connected to a wired or wireless distribution system that may allow multiple APs 105 to be connected in an ESS.

Although not shown in FIG. 1, a STA 115 may be located in the intersection of more than one coverage area 110 and may associate with more than one AP 105. A single AP 105 and an associated set of STAs 115 may be referred to as a BSS. An ESS is a set of connected BSSs. A distribution system (not shown) may be used to connect APs 105 in an ESS. In some cases, the coverage area 110 of an AP 105 may be divided into sectors (also not shown). The WLAN 100 may include APs 105 of different types (such as a metropolitan area, home network, etc.), with varying and overlapping coverage areas 110. Two STAs 115 also may communicate directly via a direct wireless link 125 regardless of whether both STAs 115 are in the same coverage area 110. Examples of direct wireless links 120 may include Wi-Fi Direct connections, Wi-Fi Tunneled Direct Link Setup (TDLS) links, and other group connections. STAs 115 and APs 105 may communicate according to the WLAN radio and baseband protocol for physical and media access control (MAC) layers from IEEE 802.11 and versions including, but not limited to, 802.11b, 802.11g, 802.11a, 802.11n, 802.11ac, 802.11ad, 802.11ah, 802.11ax, etc. In some other implementations, peer-to-peer connections or ad hoc networks may be implemented within the WLAN 100.

In some cases, a STA 115 (or an AP 105) may be detectable by a central AP 105, but not by other STAs 115 in the coverage area 110 of the central AP 105. For example, one STA 115 may be at one end of the coverage area 110 of the central AP 105 while another STA 115 may be at the other end. Thus, both STAs 115 may communicate with the AP 105, but may not receive the transmissions of the other. This may result in colliding transmissions for the two STAs 115 in a contention based environment (for example, carrier sense multiple access with collision avoidance (CSMA/CA)) because the STAs 115 may not refrain from transmitting on top of each other. A STA 115 whose transmissions are not identifiable, but that is within the same coverage area 110 may be known as a hidden node. CSMA/CA may be supplemented by the exchange of a request to send (RTS) packet transmitted by a sending STA 115 (or an AP 105) and a clear to send (CTS) packet transmitted by the receiving STA 115 (or the AP 105). This may alert other devices within range of the sender and receiver not to transmit for the duration of the primary transmission. Thus, RTS/CTS may help mitigate a hidden node problem.

Figure 2:
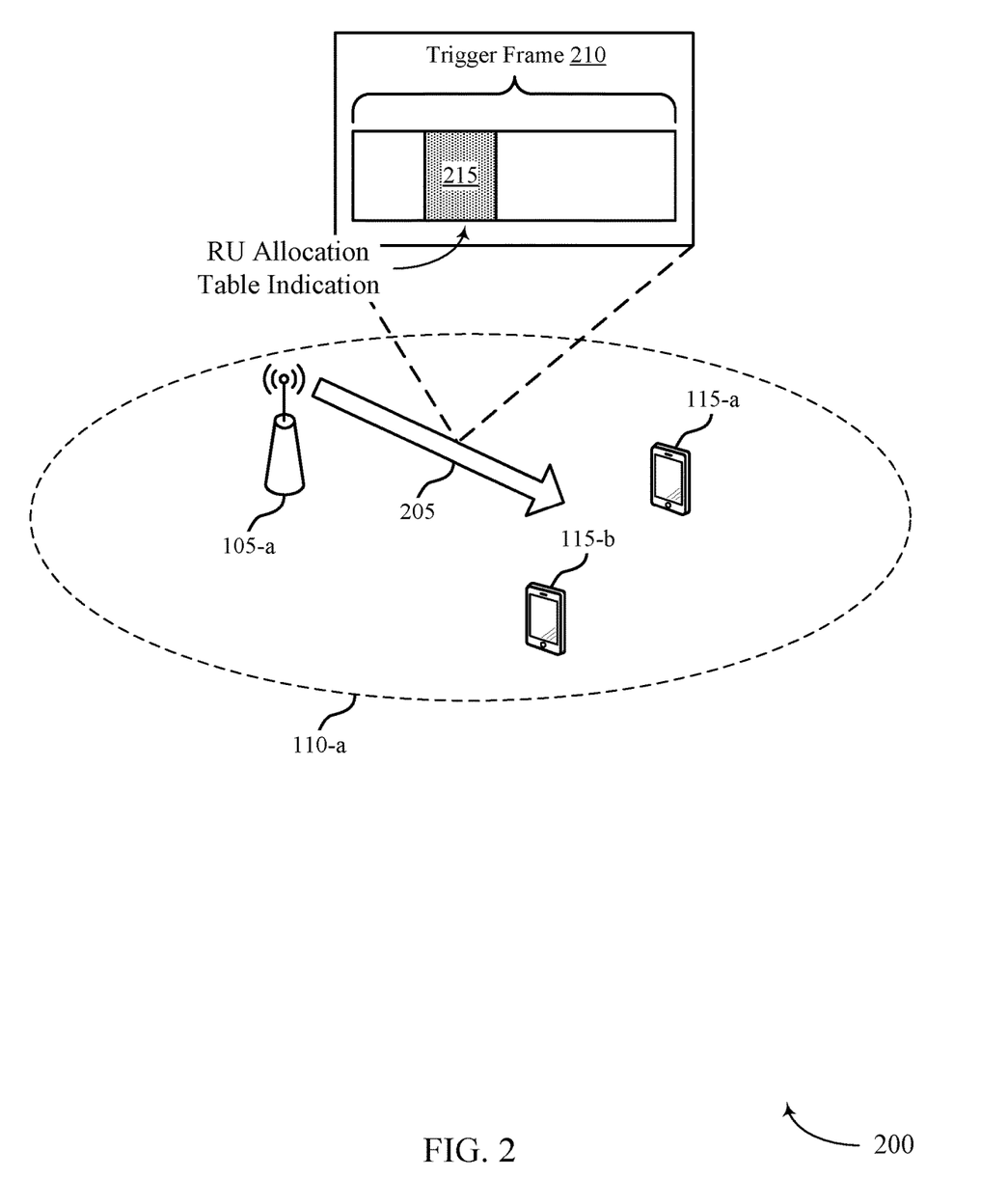

FIG. 2 shows an example of a wireless communications system 200 that supports multiplexing clients of different generations in trigger-based transmissions. The wireless communications system 200 may be an example of a Next Generation or EHT Wi-Fi system, and may include an AP 105-*a* and STAs 115-*a* and 115-*b*, and a coverage area 110-*a*, which may be examples of components described with respect to FIG. 1. The AP 105-*a* may transmit a trigger frame 210 including an RU allocation table indication 215 on the downlink 205 to the STAs 115.

In some implementations, a wireless communications system 200 may be a next generation Wi-Fi system (such as, an EHT system). In some implementations, wireless communications system 200 may also support multiple communications systems. For instance, wireless communications system 200 may support EHT communications and HE communications. In some implementations, the STA 115-*a* and the STA 115-*b* may be different types of STAs. For example, the STA 115-*a* may be an example of an EHT STA 115, while the STA 115-*b* may be an example of an HE STA. STA 115-*b* may be referred to as a legacy STA 115.

In some instances, EHT communications may support a larger bandwidth than legacy communications. For instance, EHT communications may occur over an available bandwidth of 320 MHz, whereas legacy communications may occur over an available bandwidth of 160 MHz. Additionally, EHT communications may support higher modulations than legacy communications. For instance, EHT communications may support 4K or 16K quadrature amplitude modulation (QAM), whereas legacy communications may support 1024 QAM. EHT communications may support a larger number of spatial streams (such as, space-time-streams) than legacy systems. In one non-limiting illustrative example, EHT communications may support 16 spatial streams, whereas legacy communications may support 8 spatial streams. In some cases, EHT communications may occur a 2.4 GHz channel, a 5 GHz channel, or a 6 GHz channel in unlicensed spectrum.

In some implementations, AP 105-*a* may transmit a trigger frame 210 to one or more STAs 115 (such as, STA 115-*a* and STA 115-*b*). In some implementations, the trigger frame may solicit an uplink transmission from the STAs 115. However, the trigger frame 210 may be received by an EHT STA 115-*a* and HE STA 115-*b*. The trigger frame 210 may be configured to solicit an uplink transmission from only HE STAs 115-*b*. In some implementations, trigger frame 210 may be configured to solicit an uplink transmission from EHT STAs 115-*a*. In some other implementations, the trigger frame 210 may be configured to solicit an uplink transmission from one or more EHT STAs 115-*a* and one or more HE STAs 115-*b*, as described in greater detail with respect to FIGS. 3-5.

Figure 3:
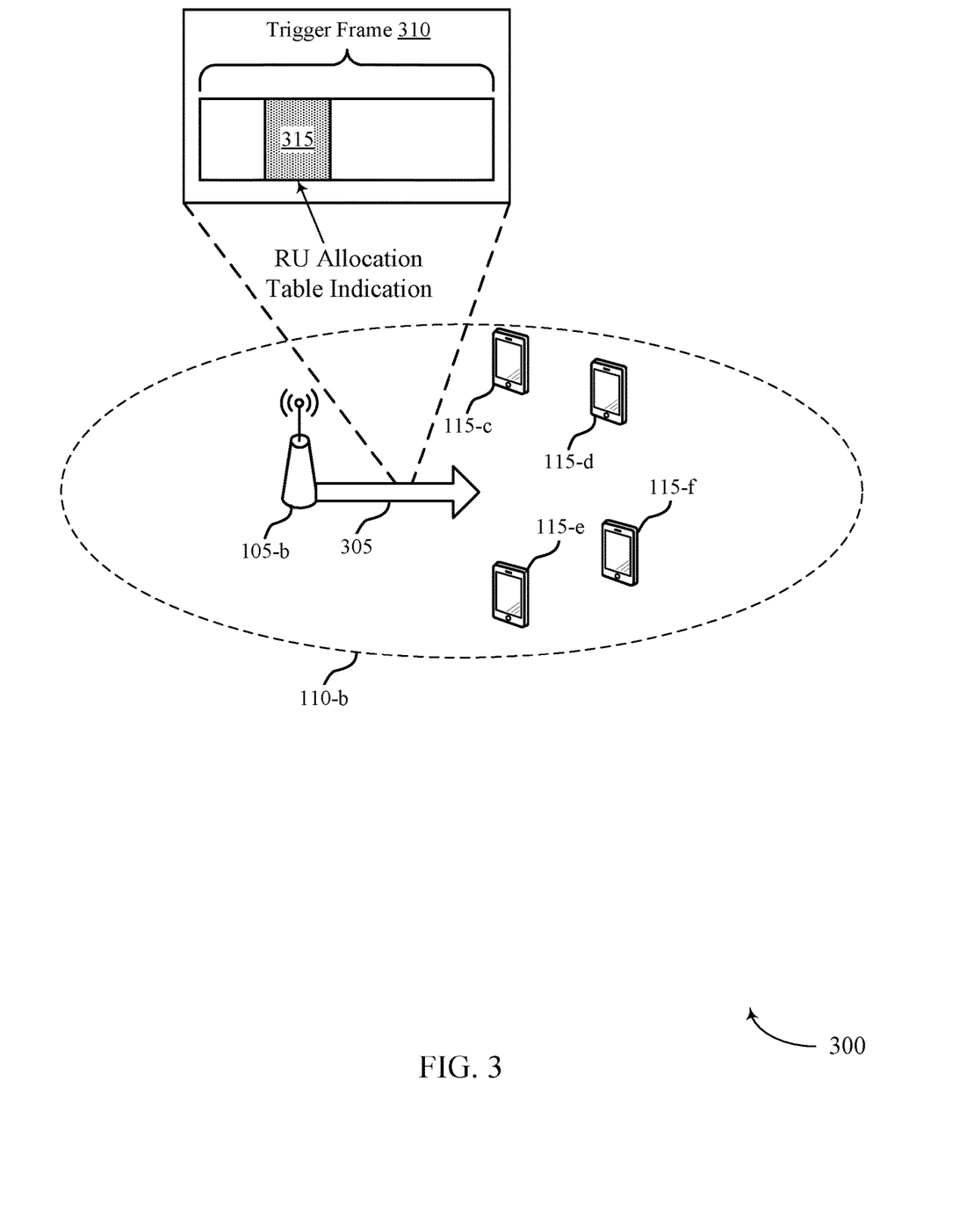

FIG. 3 shows an example of a wireless communications system 300 that supports multiplexing clients of different generations in trigger-based transmissions. The wireless communications system 300 may be an example of a Next Generation or EHT Wi-Fi system, and may include an AP 105-*b*. AP 105-*b* may be an example of an EHT AP 105. The wireless communications system 300 may include EHT STA 115-*c* and EHT STA 115-*d*, and HE STA 115-*e* and HE STA 115-*f*, and a coverage area 110-*b*, which may be examples of components described with respect to FIGS. 1 and 2. The AP 105-*b* may transmit a trigger frame 310 including an RU allocation table indication 315 on the downlink 305 to the STAs 115. In some implementations, STAs 115 may be referred to as clients.

In some implementations, an EHT AP 105 may serve both HE STAs 115 and EHT STAs 115. The EHT AP 105 may send a trigger-based PPDU that may trigger a response from HE STAs 115 only, from EHT STAs 115 only, or from both HE STAs 115 and EHT STAs 115. STAs 115 that are scheduled in the trigger frame may respond to the trigger-based PPDU. In some implementations, an EHT AP 105 may trigger HE STAs 115 (and not EHT STAs 115) by sending an HE trigger frame format. In some implementations, an EHT AP 105 may trigger EHT STAs 115 (and not EHT STAs 115) by sending an HE trigger frame format or an HE trigger frame format including some field or bit allocation adjustments. In some implementations, an EHT AP 105 may trigger EHT STAs 115 and HE STAs 115 by sending an HE trigger frame format including some field or bit allocation adjustments.

The trigger frame 310 may solicit a response from one or more EHT STAs 115 or one or more HE STAs 115, or both. In some implementations, STAs 115 may not transmit unsolicited uplink transmissions in response to trigger frame 310. In some implementations, trigger frame 310 may solicit an uplink orthogonal frequency division multiple access (OFDMA) transmission or an OFDMA with multi-user with multiple-input multiple-output (MU-MIMO) transmission.

In some implementations, an EHT AP 105-*b* may solicit uplink transmissions from one or more HE STAs (such as, STA 115-*e* and STA 115-*f*). AP 105-*b* may transmit trigger frame 310 using an HE physical layer convergence procedure (PLCP) protocol data unit (PPDU) format. In some implementations, EHT STAs 115-*c* and 115-*d* may be backwards compatible with legacy devices and operations. In such cases, EHT STAs 115-c and 115-d may detect trigger frame 310 soliciting uplink transmission from HE STAs 115 115-e and 115-f, and may backoff transmitting for a period of time.

In another illustrative example, an EHT AP 105-b may solicit uplink transmissions from one or more EHT STAs (such as, STA 115-c and STA 115-d). Trigger frame 310 may be formatted such that HE STAs (such as, STA 115-e and STA 115-f) may detect trigger frame 310 and backoff for a period of time. The trigger frame may be a new trigger type corresponding to an EHT trigger frame 310. In some implementations, the new trigger type may include a format of the common information (Common Info) field and the user information (User Info) field of trigger frame 310 differently than corresponding fields in a legacy trigger frame. In some other implementations, AP 105-b may implement any of the options described below with respect to soliciting uplink transmissions from both EHT STAs 115 and HE STAs 115.

In some implementations, an EHT AP 105-b may solicit uplink transmissions from a combination of one or more HE STAs 115 (such as, STA 115-e and STA 115-f) and one or more EHT STAs 115 (STA 115-c and STA 115-d). AP 105-b may not use a new trigger type, so that legacy STAs 115 such as, STA 115-e and STA 115-f) may detect and process trigger frame 310. To address backward compatibility with legacy STAs 115-e and 115-f, AP 105-b may use a trigger frame with a legacy frame format, such as an HE trigger frame format. In some implementations, when EHT STAs 115-c and 115-d and HE STAs 115-e and 115-f are triggered are triggered together for uplink transmissions, all triggered STAs 115 may use a legacy number of spatial streams. That is, while EHT STAs 115-c and 115-d may support inserting, for example, 16 HE-long training fields (LTFs) into a preamble of a trigger-based PPDU and transmitting using 16 spatial streams, the EHT STAs 115-c and 115-d may reduce these numbers when scheduled together with HE STAs 115-e and 115-f For instance, EHT STAs 115-c and 115-d may insert 8 HE-LTFs into the preamble of a trigger-based PPDU, and may transmit using up to 8 spatial streams. In some cases, AP 105-b may indicate a larger bandwidth, such as a 320 MHz bandwidth, to EHT STAs 115-c and 115-d in trigger frame 310.

Figure 4:
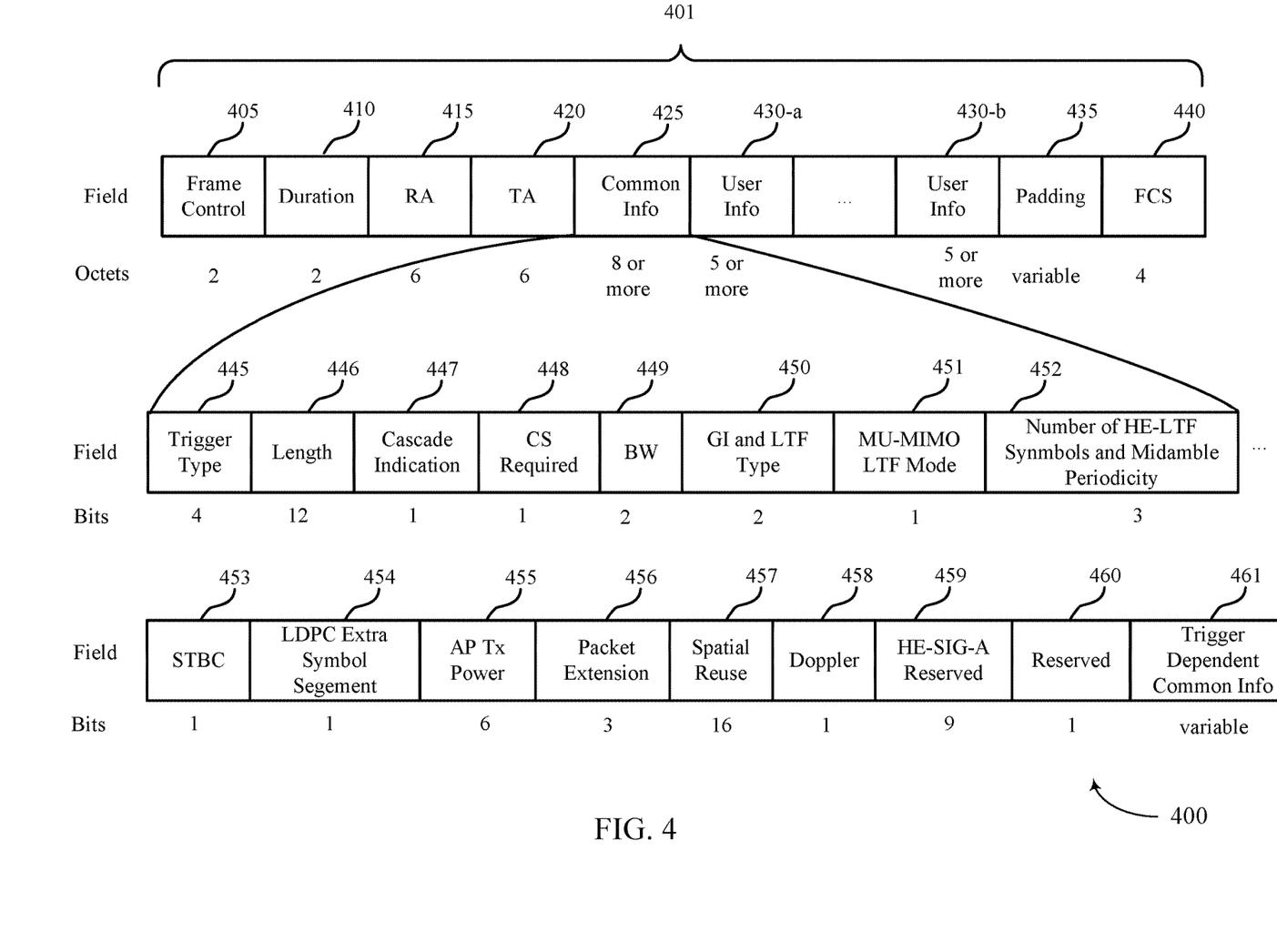
FIGS. 4 and 5 show examples of trigger frame formats that support EHT trigger-based transmissions.

FIG. 4 shows an example of a trigger frame format 400 that supports multiplexing clients of different generations in trigger-based transmissions. In some implementations, trigger frame format 400 may include a trigger frame 401, which may be an example of an HE trigger frame. The trigger frame format 400 may be implemented by one or more APs 105 or STAs 115, which may be examples of corresponding devices described with respect to FIGS. 1, 2, and 3.

In some implementations, as described in greater detail with respect to FIG. 3, an AP 105 may transmit a trigger frame 401 soliciting an uplink transmission from one or more STAs 115. In some cases, the trigger frame 401 may solicit uplink transmissions from HE STAs and from EHT STAs.

In some cases, the trigger frame 401 may include frame control field 405 including 2 octets, a duration field 410 including 2 octets, a receiver address (RA) field 415 including 6 octets, and a transmitter address (TA) field 420 including 6 octets. The trigger frame 401 may further include common info field 425 including 8 or more octets, and one or more user info fields 430, including 5 or more octets. In some implementations, one or more padding fields 435 may include a variable number of octets, and a frame check sequence (FCS) field 440 may include 4 octets.

In some implementations, a common info field 425 may include multiple fields. For instance, common info field 425 may include a 4-bit trigger type field 445, a 12-bit length field 446, a 1-bit field cascade indication field 447, a 1-bit carrier sense (CS) Required field 448, a 2-bit BW field 449, a 2-bit guard interval (GI) and long training field (LTF) Type field 450, a 1-bit MU-MIMO field 451, a 3-bit number of HE-LTF Symbols and Midamble Periodicity field 452, a 1-bit space time block coding (STBC) field 453, a 1-bit low density parity check (LDPC) Extra Symbol Segment field 454, a 6-bit AP Tx Power field 455, a 3-bit packet extension field 456, a 16-bit spatial reuse field 457, a 1-bit Doppler field 458, a 9 bit HE SIG-A Reserved field 459, a 1-bit Reserved field 460, and a variable bit Trigger Dependent Common Info field 461.

In some implementations, a legacy STA may not use some or all of the 9 bits in the HE SIG-A Reserved field 459. Instead, one or more of the 9 bits of HE SIG-A Reserved field 459 may be copied directly into an HE-SIG-A field of an HE transmission-based PPDU. In some implementations, the legacy STAs may be configured to expect the 9 bits of the HE SIG-A Reserved field 459 to be set to 1 bit.

In some implementations, the trigger frame 401 may indicate a larger bandwidth for EHT STAs. An AP may transmit a 1 bit reserved field (such as, Reserved field 460) in a common info field 425. The 1 bit reserve field may indicate a larger bandwidth (such as, a 320 MHz bandwidth). The AP may set the bit to 1 to indicate to a STA to transmit over the 320 MHz bandwidth. Otherwise (such as, the AP may set the bit to 0), the STA may transmit over a bandwidth indicated in the BW field 449. In some cases, the AP may use one or more bits in the HE SIG-A Reserved field 459 to indicate the larger bandwidth (such as, 320 MHz). For instance, the AP may set one bit of the HE SIG-A Reserved field 459 to 0 to indicate to a receiving STA a trigger-based PPDU BW. The receiving STA may transmit on the resources assigned to it. For instance, the receiving STA may transmit over the 320 MHz bandwidth if indicated. Otherwise, the STA may transmit over a bandwidth indicated in the BW field 449.

In some implementations, legacy STAs may determine the PPDU BW through the BW field. This value may assist in determining a spectral mask that will be applied to the transmission. The signal waveform of each STA may occupy the frequency resources allocated to it. An HE STA may support up to a 160 MHz bandwidth while an EHT STA may support up to a 320 MHz bandwidth. To support operation of both EHT and HE devices together in 320 MHz uplink transmissions, the AP may schedule the HE STAs in the primary 160 MHz frequency segment (such as, two 80 MHz channels). A 320 MHz tone plan may be a 2*2*996 tone RU plan for some systems.

Figure 5:
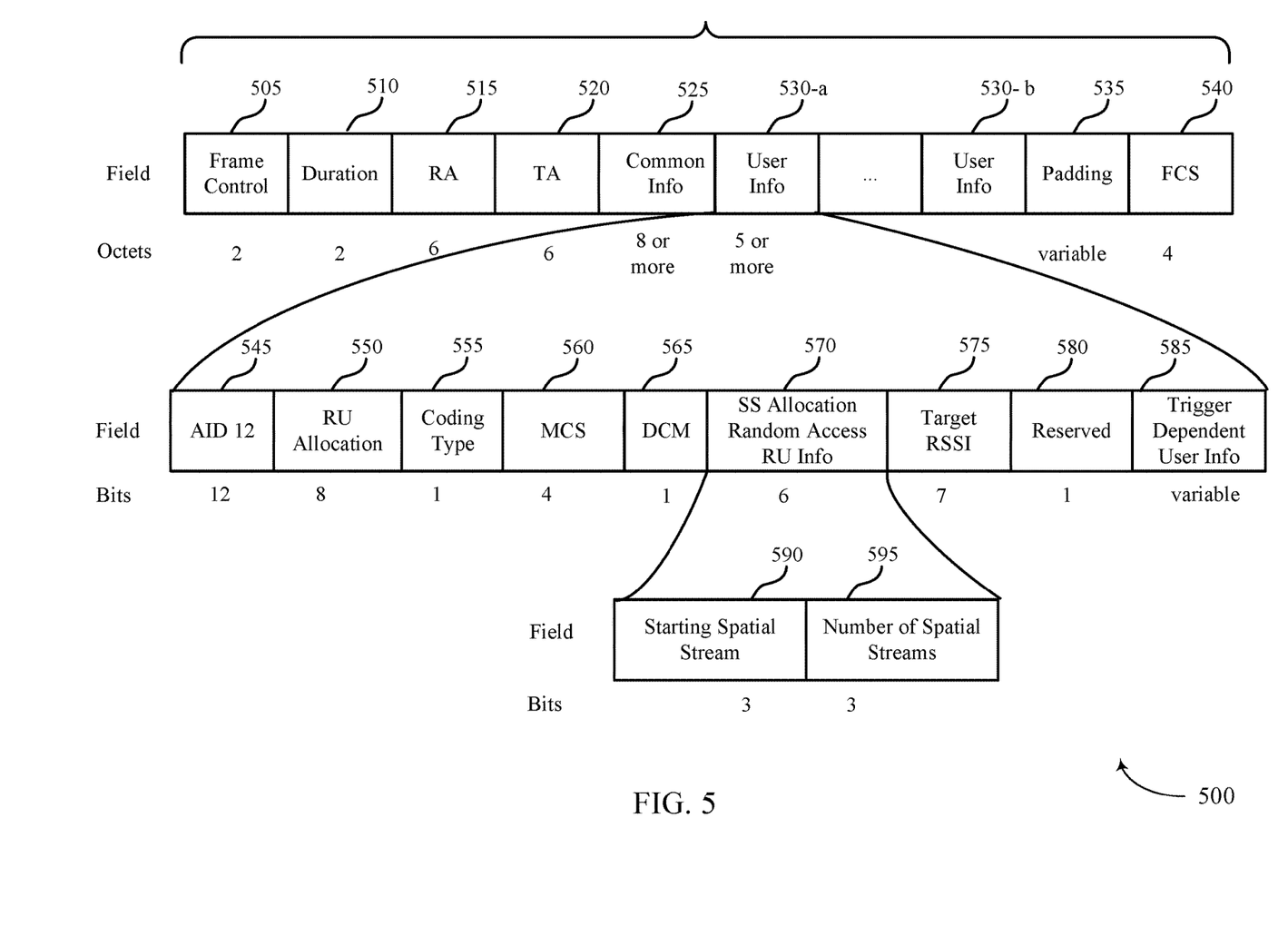

FIG. 5 shows an example of a trigger frame format 500 that supports multiplexing clients of different generations in trigger-based transmissions. In some implementations, trigger frame format 500 may include a trigger frame 501, which may be an example of an HE trigger frame. In some implementations, trigger frame format The trigger frame format 500 may be implemented by one or more APs 105 or STAs 115, which may be examples of corresponding devices described with respect to FIGS. 1-3.

In some examples, as described in greater detail with respect to FIGS. 3 and 4, an AP 105 may transmit a trigger frame 501 soliciting an uplink transmission from one or more STAs. In some cases, the trigger frame 501 may solicit uplink transmissions from HE STAs and from EHT STAs.

In some cases, the trigger frame 501 may include frame control field 505 including 2 octets, a duration field 510 including 2 octets, an RA field 515 including 6 octets, and a TA field 520 including 6 octets. The trigger frame 501 may further include common info field 525 including 8 or more octets, and one or more user info fields 530, including 5 or more octets. In some implementations, one or more padding fields 535 may include a variable number of octets, and a FCS field 540 may include 4 octets.

In some implementations, an AP may reuse an existing legacy RU allocation table to solicit one or more uplink transmissions from one or more STAs, and may indicate a bandwidth for the transmissions by using the legacy RU allocation table. For example, the AP may reuse the RU allocation table defined for 802.11ax. The trigger frame 501 may include one or more user info fields 530. User info field 530 may include one or more fields. For instance, the user info field 530 may include a 12-bit association identifier (AID) field 545, an 8-bit RU allocation field 550, a 1 bit coding type field 555, and a 4-bit modulation and coding scheme (MCS) field 560. In some cases, the user info field 530 may further include a 1-bit dual carrier modulation (DCM) field 565, a 6-bit subscriber station (SS) Allocation Random Access RU Info field 570, a 7-bit Target received signal strength indicator (RSSI) field 575, a 1-bit reserved field 580, and a variable bit Trigger Dependent User Info field 585.

In some implementations, an AP may include, in a user info field 530, an RU allocation field 550. RU allocation field 550 may include an RU allocation table, which may indicate a resources assigned to the STA for uplink transmissions. The RU allocation field 550 may include a bitmap, which may be referred to as an RU allocation table. For instance, the AP may reuse an existing legacy RU allocation table (such as, an RU allocation table defined for 802.11ax). In some implementations, the RU allocation field 550 may include 8 bits indicating assigned RU allocation for uplink transmission. In an illustrative example, a common info field 525 may have a value of 20/40/80/160 MHz. In such examples, the HE RU allocation table in RU allocation field 550 of user info field 530-a may be sufficient. A first bit, B, of the eight total bits in the RU allocation field 550 may indicate to the STA that it its assignment of RUs is located in a primary 80 MHz segment or a secondary MHz segment. The remaining seven bits of the RU allocation field 550 may indicate RUs allocated to the STA. In another illustrative example, the common info field 525 may indicate a 320 MHz BW. In such examples, an HE RU allocation table in RU allocation field 550 of user info field 530-a may sufficient to indicate RUs to EHT STA where one reserved bit in the user info field 530-a is used to indicate whether this STA is allocated resources in a primary 160 MHz segment or a secondary 160 MHz segment.

A first bit B may indicate whether the allocation is in a primary 80 MHz channel or a secondary 80 MHz channel. The remaining bits (such as, 7 bits) may indicate an RU allocation index corresponding to an entry in the RU allocation table. The AP may schedule HE STAs on the primary 160 MHz in a 320 MHz bandwidth (such as, 160 MHz plus 160 MHz) for an uplink EHT transmission with HE transmissions. The primary 160 MHz channel may contain both a primary 80 MHz and a secondary 80 MHz defined for legacy STAs. In some implementations, the legacy 1-bit indication (such as, B) may be sufficient to schedule transmissions in the primary 160 MHz of the uplink transmission. For EHT STAs, the RU allocation table may indicate assigned RUs for uplink transmission across up to 320 MHz, as opposed to the 160 MHz for legacy devices, as described below.

In some implementations, the RU allocation table may be used for EHT STAs. The RU allocation table may be used to indicate a larger bandwidth (such as, 320 MHz) for EHT STAs. In an illustrative example, the AP and the STAs may reuse the legacy RU allocation table for EHT RU allocation table operations. For instance, the EHT RU allocation may be updated to include an additional bit (such as, bit C) to indicate whether the resource allocation is in the primary 160 MHz or in the secondary 160 MHz. Examples of such systems may use a 320 MHz bandwidth (with a primary 160 MHz and secondary 160 MHz), 4 80 MHz channels, or a 160 MHz channel with two 80 MHz channels, or other formats.

The additional bit C added to the RU allocation table may indicate whether an allocation of assigned RUs for uplink transmission is in the primary 160 MHz (which may contain the primary 80 MHz and immediately higher secondary 80 MHz) or in the secondary 160 MHz (which may contain the higher secondary 80 MHz and the highest secondary 80 MHz frequency segments). Within each of the 160 MHz sections, the bit B may indicate the lower or higher 80 MHz frequency subsection. If an existing RU allocation table is adjusted or redefined to include the additional bit C, then the redefined RU allocation table may be sufficient to perform the above described operation. In some implementations, EHT AID 12 fields 545 and HE AID 12 545 fields may be clearly differentiated and planned to support the redefined RU allocation table including the additional bit C. For example, an AID included in an AID 12 filed 545 may be decreased to 11 bits to support the extra bit included in the redefined RU allocation field 550. A shorter association identifier may require more particular planning to ensure clear association identification for all served STAs.

Table 1 provides a sample of an RU allocation table.

TABLE 1

| B19-B13 | Description | Number of entries |
|---|---|---|
| 0-36 | Possible 26-tone RU cases in 80 MHz | 37 |
| 37-52 | Possible 52-tone RU cases in 80 MHz | 16 |
| 53-60 | Possible 106-tone RU cases in 80 MHz | 8 |
| 61-64 | Possible 242-tone RU cases in 80 MHz | 4 |
| 65-66 | Possible 484-tone RU cases in 80 MHz | 2 |
| 67 | 996-tone RU cases in 80 MHz | 1 |
| 68 | 2x996-tone RU case | 1 |
| 69-127 | Reserved | 59 |
| Total | | 128 |

In some implementations, a new row may be added to the table (such as, 69—2*2*996 tone RU case—1). This entry may be used when the AP schedules EHT clients for uplink transmissions.

In another illustrative example, the AP may assign RUs to STAs (for example, both legacy and EHT STAs) in increasing order of frequency, and each EHT STA may determine a RU allocation based on the aggregate of the other RU allocations. For example, an EHT STA receiving the trigger frame 501 may identify each User Info field 530, and may parse the User Info fields 530 to determine the RU sizes allocated to each user. The EHT STA may track the sum of the allocated bandwidths, and may determine whether the RU allocation for that EHT STA is in the primary or secondary 160 MHz based on the sum and the increasing order of frequency. In some implementations, the EHT STA may parse each User Info field 530. In some other implementations, the EHT STA may parse each User Info field 530 preceding the User Info field 530 corresponding to that EHT STA. That is, if User Info field 530-*b* corresponds to an EHT STA, then the EHT STA will parse User Info field 530-*a* and other preceding User Info Fields 530. This may allow the AP to use legacy format for the User Info field 530 without any modifications.

In another illustrative example, the AP and the EHT STAs may utilize a new EHT RU allocation table that is different from the legacy RU allocation table. In such examples, the RU allocation field 550 in a user info field 530 of the trigger frame 501 may include a first bit, B, indicating whether the allocation is in the primary 160 MHz or the secondary 160 MHz. The rest of the bits (such as, 7 bits) may indicate the RU allocation index corresponding to an entry in the new EHT RU allocation table. EHT STAs may use the EHT RU allocation table, and legacy STAs may use the legacy RU allocation table based on a same sized RU allocation field 550 in a User Info field 530 of the trigger frame 501.

Table 2 provides a sample of an EHT RU allocation table

TABLE 2

| 7 Bits | Description | # of Entries |
| --- | --- | --- |
| 0-31 | Possible 52-tone RU cases in 160 MHz | 32 |
| 32-47 | Possible 106-tone RU cases in 160 MHz | 16 |
| 48-55 | Possible 242-tone RU cases in 160 MHz | 8 |
| 56-59 | Possible 484-tone RU cases in 160 MHz | 4 |
| 60-61 | Possible 996-tone RU cases in 160 MHz | 2 |
| 62 | 2x996 tone RU case in 160 MHz | 1 |
| 63 | 2x2x996 Tone RU case in 320 MHz | 1 |
| 64-127 | Reserved | 64 |

An EHT STA may use table 2 for RU allocation when the bandwidth for the uplink transmission is the larger bandwidth (such as, 320 MHz). The EHT STA may use a legacy RU allocation table if using a legacy bandwidth.

Figure 6:
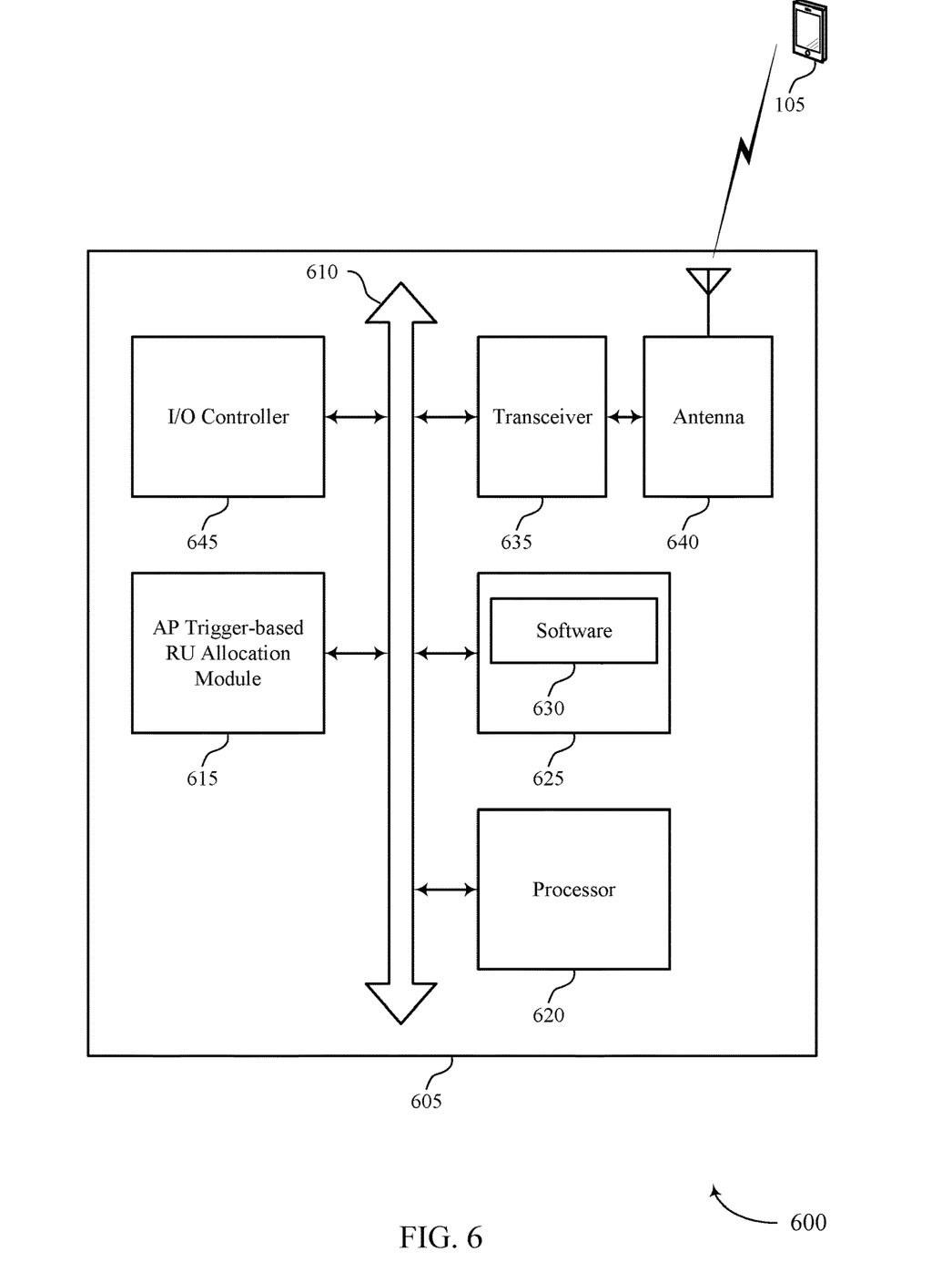
FIG. 6 shows a block diagram of an example system including an access point (AP) that supports multiplexing clients of different generations in trigger-based transmissions.

FIG. 6 shows a block diagram of an example system 600 including an AP 605 that supports multiplexing clients of different generations in trigger-based transmissions. The AP 605 may be an example of or include the components of a wireless device configured to operate in a Next Generation or EHT Wi-Fi system, such as an AP 105 as described above, for example, with reference to FIG. 1. The AP 605 may include components for bi-directional voice and data communications including components for transmitting and receiving communications, including a processor 620, a memory 625, software 630, a transceiver 635, an antenna 640, and an I/O controller 645. Additionally, the AP 605 may include an AP trigger-based RU allocation module 615, which may implement one or more of the techniques described with respect to FIGS. 1-5. These components may be in electronic communication via one or more buses (such as bus 610).

Figure 7:
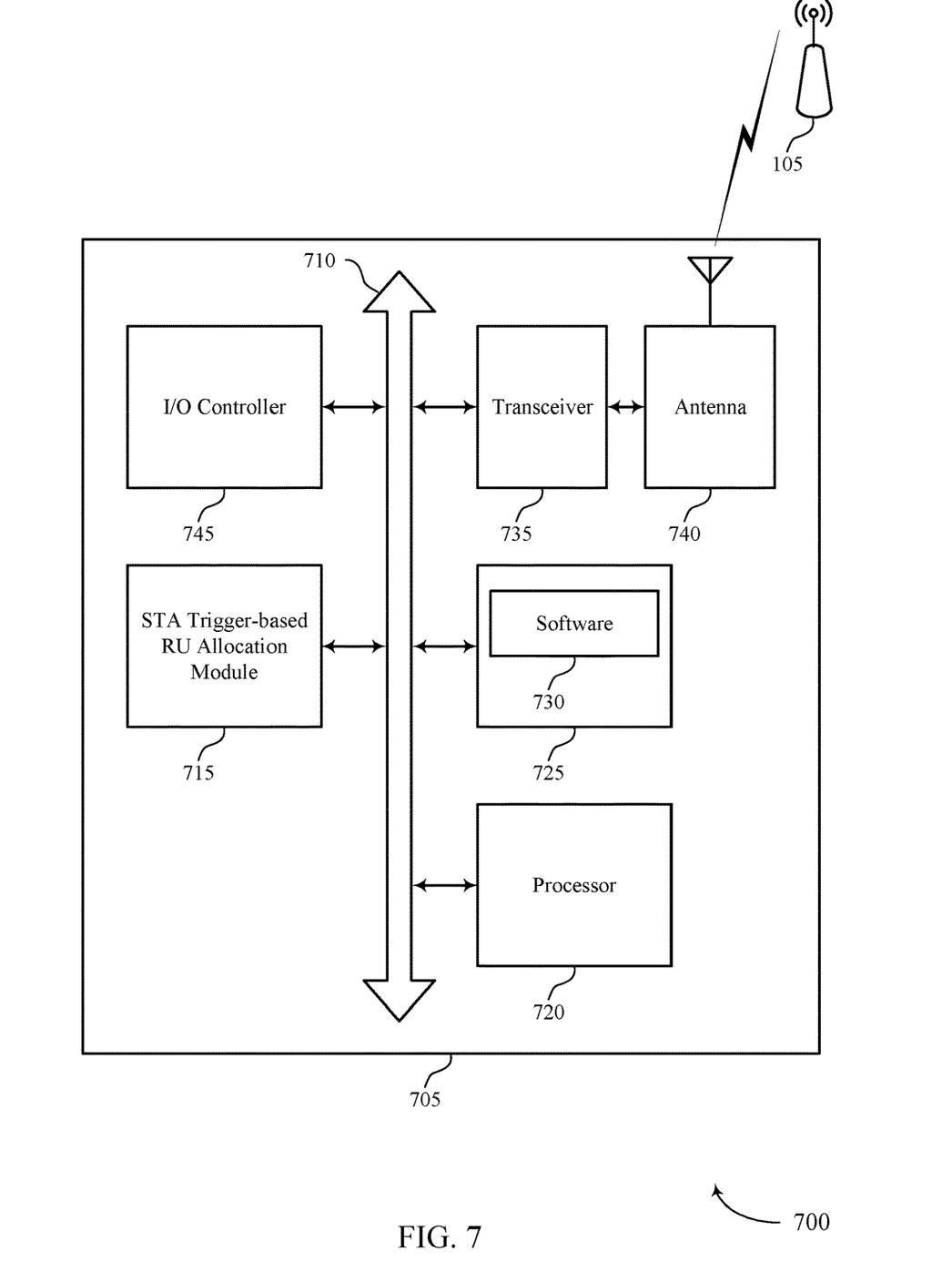
FIG. 7 shows a block diagram of an example system including a mobile station (STA) that supports multiplexing clients of different generations in trigger-based transmissions.

FIG. 7 shows a block diagram of an example system 700 including a STA 705 that supports multiplexing clients of different generations in trigger-based transmissions. The STA 705 may be an example of or include the components of a wireless device configured to operate in a Next Generation or EHT Wi-Fi system, such as a STA 115 as described above, for example, with reference to FIG. 1. The STA 705 may include components for bi-directional voice and data communications including components for transmitting and receiving communications, including a processor 720, a memory 725, software 730, a transceiver 735, an antenna 740, and an I/O controller 745. Additionally, the STA 705 may include a STA trigger-based RU allocation module 715, which may implement one or more of the techniques described with respect to FIGS. 1-5. These components may be in electronic communication via one or more buses (such as bus 710).

Figure 8:
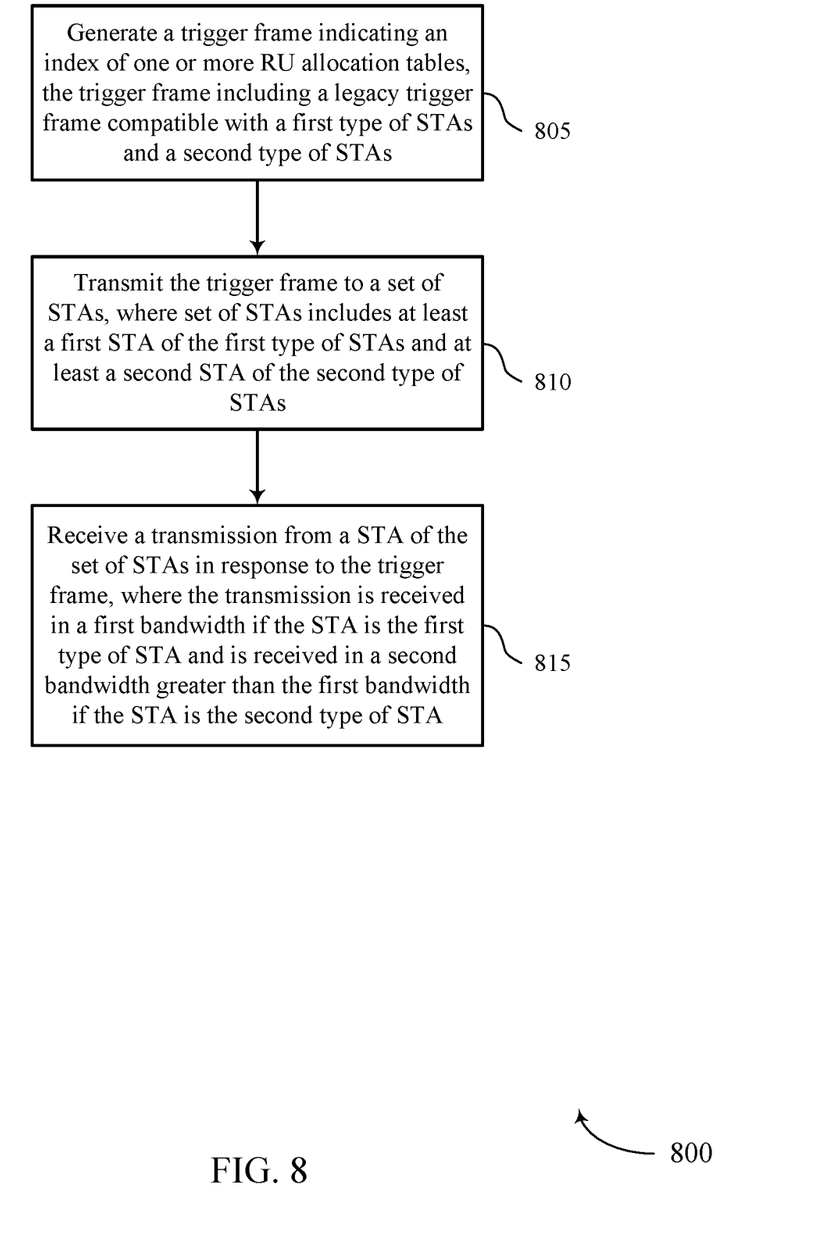
FIGS. 8 and 9 show flowcharts illustrating example methods for multiplexing clients of different generations in trigger-based transmissions.

FIG. 8 shows a flowchart illustrating an example method 800 for EHT trigger-based transmissions. The operations of method 800 may be implemented by a AP 105 or its components as described herein. For example, the operations of method 800 may be performed by a AP trigger-based RU allocation module as described with reference to FIG. 6.

At block 805 the AP 105 may generate a trigger frame containing one or more user info fields 530, each containing an RU allocation field 550 describing a bitmap of RU allocation. The trigger frame may be a legacy trigger frame compatible with a first type of STAs and a second type of STAs. In some implementations, the one or more allocation tables may include a first RU allocation table corresponding to the first type of STAs and a second RU allocation table corresponding to the second type of STAs. The trigger frame may allocate a first set of RUs in the first bandwidth for the first type of STAs based at least in part on the first RU allocation table and the index, and may allocate a second set of RUs in the second bandwidth for the second type of STAs based at least in part on the second RU allocation table and the index. In some implementations, the trigger frame may indicate the second bandwidth using a bit in a HE-SIG-A reserved field. At block 810 the AP 105 may transmit the trigger frame to a set of STAs including at least a first STA of the first type of STAs and at least a second STA of the second type of STAs, where the first type of STAs and the second type of STAs determine resources for transmission differently using the index of the one or more RU allocation tables. The AP 105 may allocate, for a plurality of STAs of the set of STAs, sets of resources for transmission in order of increasing frequency, wherein the second STA of the second type of STAs determines the resources for transmission based at least in part on a set of resources allocated for a third STA. At block 815 the AP 105 may receive a transmission from a STA of the set of STAs in response to the trigger frame, where the transmission is received in a first bandwidth if the STA is the first type of STA and is received in a second bandwidth greater than the first bandwidth if the STA is the second type of STA.

Figure 9:
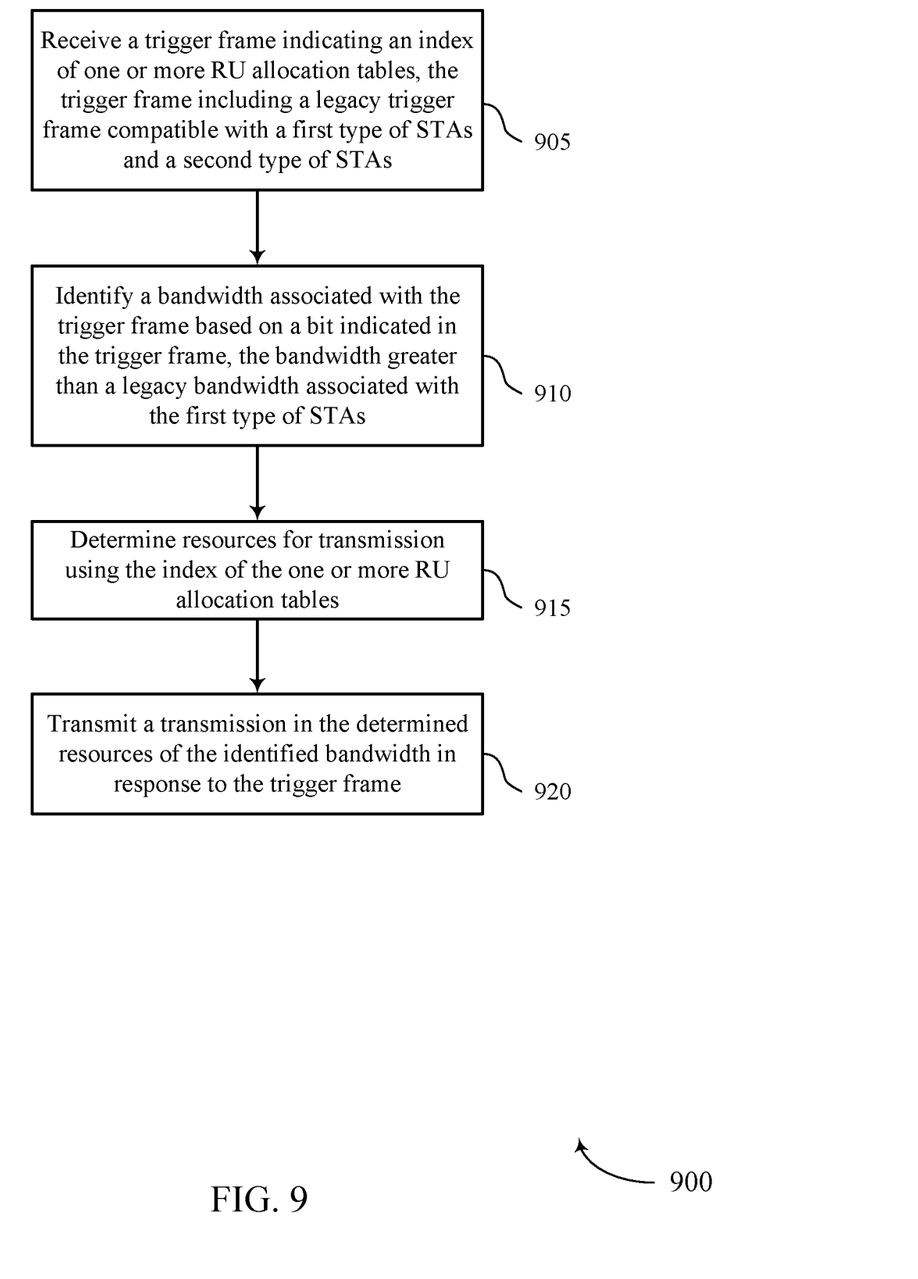

FIG. 9 shows a flowchart illustrating an example method 900 for EHT trigger-based transmissions. The operations of method 900 may be implemented by a STA 115 or its components as described herein. For example, the operations of method 900 may be performed by a STA trigger-based RU allocation module as described with reference to FIG. 7.

At block 905 the STA 115 may receive a trigger frame indicating an index of one or more RU allocation tables, where the trigger frame may be a legacy trigger frame compatible with a first type of STAs and a second type of STAs. The one or more RU allocation tables include a first RU allocation table corresponding to the first type of STAs and a second RU allocation table corresponding to the second type of STAs. At block 910 the STA 115 may identify a bandwidth associated with the trigger frame based at least in part on a bit indicated in the trigger frame, the bandwidth greater than a legacy bandwidth associated with the first type of STAs.

At block 915 the STA 115 may determine resources for transmission using the index of the one or more RU allocation tables. Determining the resources for transmission may include determining the resources for transmission using the index and the second RU allocation table. Determining the resources for transmission may include identifying an additional bit in a legacy RU allocation table, and the resources for transmission may be determined using an index, a legacy RU allocation table, and the identified additional bit. At block 920 the STA 115 may transmit a transmission in the determined resources of the identified bandwidth in response to the trigger frame.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general-purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, for example, one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A first wireless station, comprising:
 a processor;

memory in electronic communication with the processor; and instructions stored in the memory and executable by the processor to cause the first wireless station to:

receive a first physical layer convergence protocol (PLCP) protocol data unit (PPDU) compatible with both legacy wireless stations and non-legacy wireless stations, the first wireless station being a non-legacy wireless station, the first PPDU including a trigger frame configured to solicit an uplink transmission of a second PPDU, the trigger frame including a common information field and one or more user information fields including a first user information field for the first wireless station, the first user information field including a resource unit (RU) allocation field that includes an index to an RU allocation table configured for a legacy bandwidth;

identify a non-legacy bandwidth associated with the second PPDU based at least in part on a value of a bandwidth field in the first PPDU, the non-legacy bandwidth being greater than a maximum legacy bandwidth associated with the legacy wireless stations;

identify a value of a bit in the first user information field that is outside of the RU allocation field;

identify whether a location of a first RU for the first wireless station is located in a first portion of a channel or a second portion of the channel based at least in part on the value of the bit, the channel having the identified non-legacy bandwidth;

determine the location of the first RU within the identified first or second portion of the channel based on the index and the RU allocation table; and transmit the second PPDU via the first RU in response to the trigger frame.

2. The first wireless station of claim 1, wherein the non-legacy bandwidth is 320 MHz, the first portion of the channel is a primary 160 MHz subchannel of the channel, and the second portion of the channel is a secondary 160 MHz subchannel of the channel.

3. The first wireless station of claim 1, wherein the trigger frame is further configured to solicit an uplink transmission from at least one legacy wireless station concurrent with the transmission of the second PPDU by the first wireless station.

4. A method for wireless communication by a first wireless station, the method comprising:

receiving a first physical layer convergence protocol (PLCP) protocol data unit (PPDU) compatible with both legacy wireless stations and non-legacy wireless stations, the first wireless station being a non-legacy wireless station, the first PPDU including a trigger frame configured to solicit an uplink transmission of a second PPDU, the trigger frame including a common information field and one or more user information fields including a first user information field for the first wireless station, the first user information field including a resource unit (RU) allocation field that includes an index to an RU allocation table configured for a legacy bandwidth;

identifying a non-legacy bandwidth associated with the second PPDU based at least in part on a value of a bandwidth field in the first PPDU, the non-legacy bandwidth being greater than a maximum legacy bandwidth associated with the legacy wireless stations;

identifying a value of a bit in the first user information field that is outside of the RU allocation field;

identifying whether a location of a first RU for the first wireless station is located in a first portion of a channel or a second portion of the channel based at least in part on the value of the bit, the channel having the identified non-legacy bandwidth;

determining the location of the first RU within the identified first or second portion of the channel based on the index and the RU allocation table; and transmitting the second PPDU via the first RU in response to the trigger frame.

5. The method of claim 4, wherein the non-legacy bandwidth is 320 MHz, the first portion of the channel is a primary 160 MHz subchannel of the channel, and the second portion of the channel is a secondary 160 MHz subchannel of the channel.

6. The method of claim 4, wherein the trigger frame is further configured to solicit an uplink transmission from at least one legacy wireless station concurrent with the transmission of the second PPDU by the first wireless station.

* * * * *